United States Patent
Lin et al.

(10) Patent No.: US 8,520,301 B2
(45) Date of Patent: Aug. 27, 2013

(54) LENS MODULE WITH FILTER ELEMENT

(75) Inventors: Juin-Hong Lin, New Taipei (TW); Tai-Sheng Tsai, New Taipei (TW); Shih-Che Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,604

(22) Filed: Dec. 29, 2011

(65) Prior Publication Data
US 2013/0050811 A1 Feb. 28, 2013

(30) Foreign Application Priority Data
Aug. 30, 2011 (TW) .............................. 100131098 A

(51) Int. Cl.
*G02B 5/08* (2006.01)
*G02B 1/10* (2006.01)
*G02B 5/28* (2006.01)
*G02B 5/20* (2006.01)

(52) U.S. Cl.
CPC ................ *G02B 5/281* (2013.01); *G02B 5/208* (2013.01)
USPC .......................................... 359/359; 359/586

(58) Field of Classification Search
USPC .......................... 359/350–361, 819, 584–590
See application file for complete search history.

(56) References Cited

U.S. PATENT DOCUMENTS

| 7,215,466 | B2 * | 5/2007 | Chen et al. | 359/359 |
| 7,663,686 | B2 * | 2/2010 | Chen | 348/335 |
| 2005/0068456 | A1 * | 3/2005 | Ohta et al. | 348/360 |
| 2006/0050416 | A1 * | 3/2006 | Chung et al. | 359/819 |
| 2007/0024958 | A1 * | 2/2007 | Choi et al. | 359/356 |
| 2007/0081264 | A1 * | 4/2007 | Hara et al. | 359/885 |
| 2011/0141346 | A1 * | 6/2011 | Ryu | 348/374 |

* cited by examiner

*Primary Examiner* — Thong Nguyen
(74) *Attorney, Agent, or Firm* — Altis Law Group, Inc.

(57) ABSTRACT

A lens module includes a lens barrel, at least one lens, and a filter element. The lens barrel includes an object-side end and an image-side end opposite to the object-side end. The at least one lens is received in the lens barrel. The filter element is received in the lens barrel, and includes a transparent substrate, an anti-reflection film, and an infrared filtering film. The transparent substrate includes an object-side surface facing the object-side end and an image-side surface facing the image-side end. The anti-reflection film is coated on the object-side surface, and the infrared filtering film is coated on the image-side surface.

5 Claims, 5 Drawing Sheets

LENS MODULE WITH FILTER ELEMENT

BACKGROUND

1. Technical Field

The present disclosure relates to lens modules and, particularly, to a lens module with a filter element.

2. Description of Related Art

Lens modules include at least one lens and a filter element generally positioned at an image side of the lens. The filter element includes a transparent substrate and an infrared filtering film coated on an object side of the transparent substrate. The filter element is for filtering infrared light rays while transmitting visible light rays. However, current filter elements cannot transmit 100% visible light rays and reflect a minority of visible light rays, more than about 5%, which form a glare in an image after multiple reflections.

Therefore, it is desirable to provide a lens module, which can overcome the limitations described.

DETAILED DESCRIPTION

Embodiments of the disclosure will now be described in detail, with reference to the accompanying drawings.

Figure 1:
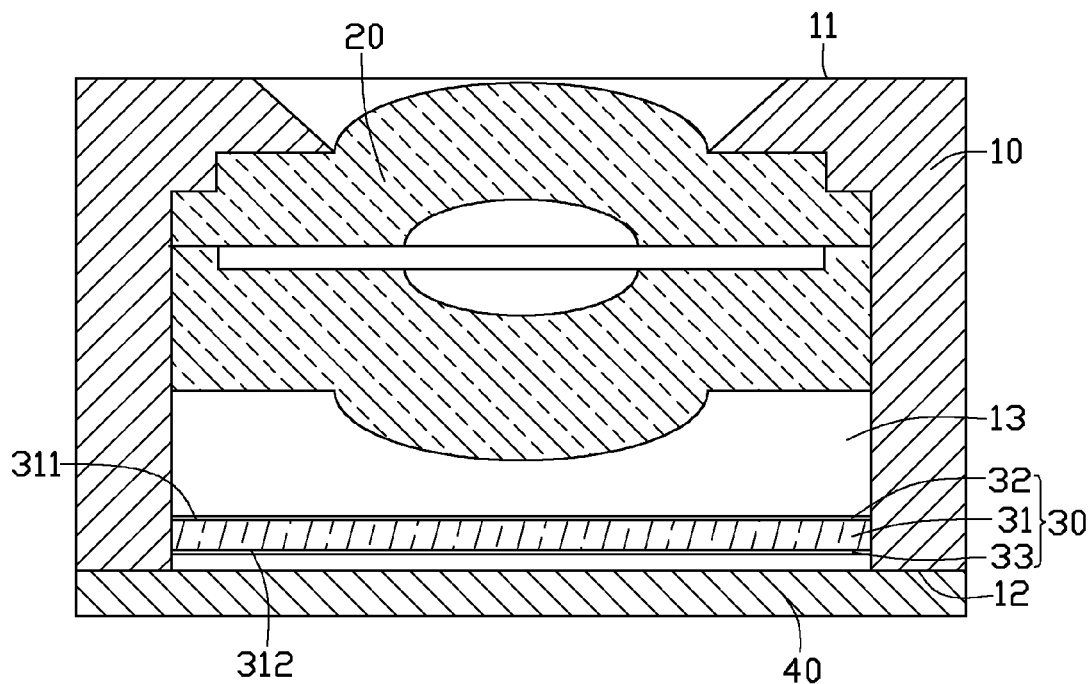
FIG. 1 is a cross-sectional schematic view of a lens module of an exemplary embodiment.

FIG. 1, shows a lens module 100, according to an exemplary embodiment. The lens module 100 includes a lens barrel 10, at least one lens 20, a filter element 30, and an image sensor 40.

The lens barrel 10 is tubular and includes an object-side end 11 and an image-side end 12 opposite to the object-side end 11. The lens barrel 10 defines a receiving room 13 extending through the object-side end 11 and the image-side end 12. In this embodiment, the lens barrel 10 is made of light-shielding/opaque/black material(s).

The at least one lens 20 is received in the receiving room 13, adjacent to the object-side end 11. Each of the at least one lens 20 is made of plastic, glass, or other transparent materials, and is spherical or aspherical. In this embodiment, the lens module 100 includes two lenses 20 arranged in the receiving room 13 from the object-side end 11 to the image side end 12.

The filter element 30 is received in the receiving room 13, adjacent to the image side end 12. The filter element 30 includes a transparent substrate 31, an anti-reflection film 32, and an infrared filtering film 33. The transparent substrate 31 includes an object-side surface 311 facing the object-side end 11 and an image-side surface 312 facing the image-side end 12. The anti-reflection film 32 is coated on the object-side surface 311, and the infrared filtering film 33 is coated on the image-side surface 312.

In this embodiment, the transparent substrate 31 is made of glass, and a thickness of transparent substrate 31 is from about 0.2 mm to about 0.8 mm. A little of copper oxide (CuO) is doped in the materials of making the transparent substrate 31 for absorbing a part of infrared light rays. The anti-reflection film 32 includes first to fourth layers orderly stacked on the object-side surface 311. The odd numbered layers of the anti-reflection film 32 are made from titanium dioxide ($TiO_2$) and the even numbered layers of the anti-reflection film 32 are made from silicon dioxide ($SiO_2$). The material and thickness of each layer of the anti-reflection film 32 are shown in Table 1.

TABLE 1

| Layers | Material | Thickness (nm) |
|---|---|---|
| First layer | $TiO_2$ | 11.52 |
| Second layer | $SiO_2$ | 28.93 |
| Third layer | $TiO_2$ | 111.15 |
| Fourth layer | $SiO_2$ | 83.78 |

The infrared filtering film 33 includes first to fifty fourth layers orderly stacked on the image-side surface 312. The odd numbered layers of the infrared filtering film 33 are made from $TiO_2$, and the even numbered layers of the infrared filtering film 33 are made from $SiO_2$. The material and thickness of each layer of the infrared filtering film 33 are shown in Table 2.

TABLE 2

| Layers | Material | Thickness (nm) |
|---|---|---|
| First layer | $TiO_2$ | 7.28 |
| Second layer | $SiO_2$ | 18.67 |
| Third layer | $TiO_2$ | 86.78 |
| Fourth layer | $SiO_2$ | 142.53 |
| Fifth layer | $TiO_2$ | 80.33 |
| Sixth layer | $SiO_2$ | 132.59 |
| Seventh layer | $TiO_2$ | 81.28 |
| Eighth layer | $SiO_2$ | 128.33 |
| Ninth layer | $TiO_2$ | 81.96 |
| Tenth layer | $SiO_2$ | 124.34 |
| Eleventh layer | $TiO_2$ | 83.38 |
| Twelfth layer | $SiO_2$ | 121.71 |
| Thirteenth layer | $TiO_2$ | 83.92 |
| Fourteenth layer | $SiO_2$ | 123.09 |
| Fifteenth layer | $TiO_2$ | 84.08 |
| Sixteenth layer | $SiO_2$ | 124.78 |
| Seventeenth layer | $TiO_2$ | 84.81 |
| Eighteenth layer | $SiO_2$ | 134.73 |
| Nineteenth layer | $TiO_2$ | 97.58 |
| Twentieth layer | $SiO_2$ | 192.39 |
| Twenty first layer | $TiO_2$ | 104.2 |
| Twenty second layer | $SiO_2$ | 148.59 |
| Twenty third layer | $TiO_2$ | 83.66 |
| Twenty fourth layer | $SiO_2$ | 143.14 |
| Twenty fifth layer | $TiO_2$ | 93.6 |
| Twenty sixth layer | $SiO_2$ | 177.52 |
| Twenty seventh layer | $TiO_2$ | 105.92 |
| Twenty eighth layer | $SiO_2$ | 158.12 |
| Twenty ninth layer | $TiO_2$ | 87.79 |
| Thirtieth layer | $SiO_2$ | 152.72 |
| Thirty first layer | $TiO_2$ | 96.32 |
| Thirty second layer | $SiO_2$ | 174.89 |
| Thirty third layer | $TiO_2$ | 104.29 |
| Thirty fourth layer | $SiO_2$ | 163.45 |
| Thirty fifth layer | $TiO_2$ | 100.46 |
| Thirty sixth layer | $SiO_2$ | 180.21 |
| Thirty seventh layer | $TiO_2$ | 115.65 |
| Thirty eighth layer | $SiO_2$ | 188.01 |
| Thirty ninth layer | $TiO_2$ | 117.25 |
| Fortieth layer | $SiO_2$ | 191.74 |
| Forty first layer | $TiO_2$ | 118.28 |
| Forty second layer | $SiO_2$ | 192.04 |
| Forty third layer | $TiO_2$ | 116.57 |
| Forty fourth layer | $SiO_2$ | 192.79 |
| Forty fifth layer | $TiO_2$ | 117.32 |
| Forty sixth layer | $SiO_2$ | 190.86 |
| Forty seventh layer | $TiO_2$ | 118.16 |

TABLE 2-continued

| Layers | Material | Thickness (nm) |
|---|---|---|
| Forty eighth layer | SiO$_2$ | 190.44 |
| Forty ninth layer | TiO$_2$ | 116.69 |
| Fiftieth layer | SiO$_2$ | 191.4 |
| Fifty first layer | TiO$_2$ | 114.71 |
| Fifty second layer | SiO$_2$ | 186.74 |
| Fifty third layer | TiO$_2$ | 113.18 |
| Fifty fourth layer | SiO$_2$ | 92.44 |

The anti-reflection film 32 can be stacked by any number of layers with other materials for anti-reflecting light rays. The infrared filtering film 33 can be stacked by any number of layers with other materials for filtering infrared light rays.

The image sensor 40 is positioned at the image-side end 12 for covering the receiving room 13. The light rays penetrating the at least one lens 20 and the filter element 30 are projected on an imaging surface of the image sensor 40 for converting the light rays to electrical signals.

Figure 2:
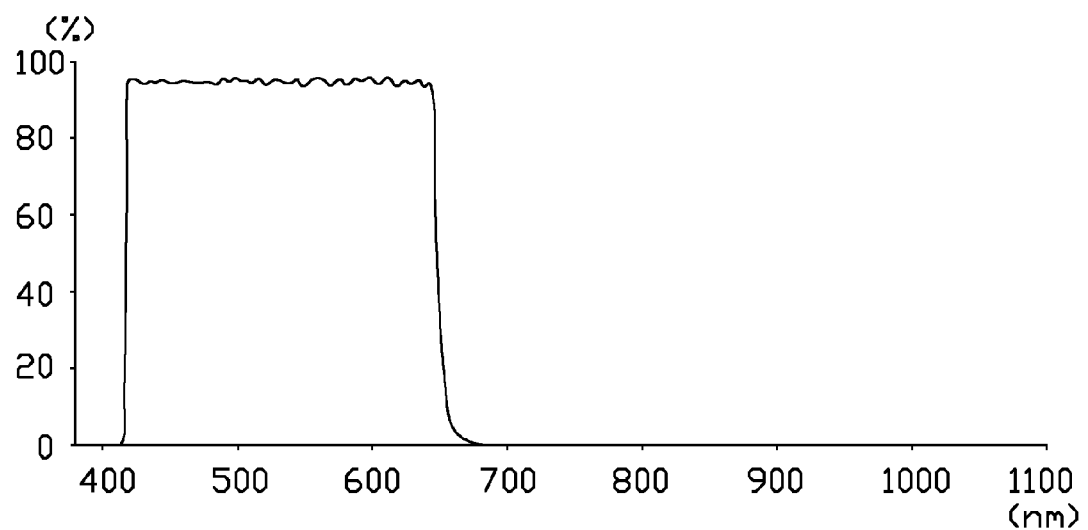
FIG. 2 is a spectrum chart of an infrared filtering film of a filter element of the lens module of FIG. 1.
Figure 3:
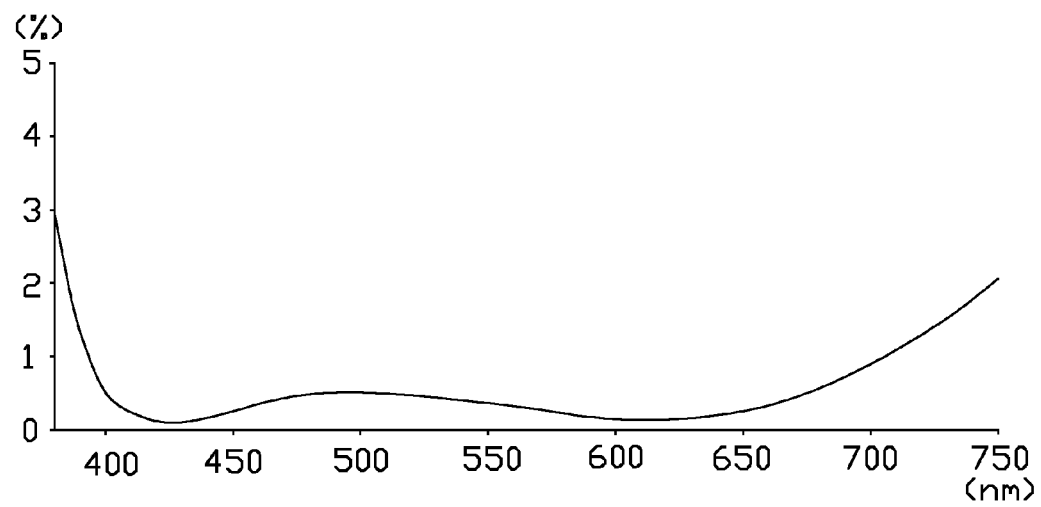
FIG. 3 is a spectrum chart of an anti-reflection film of a filter element of the lens module of FIG. 1.
Figure 4:
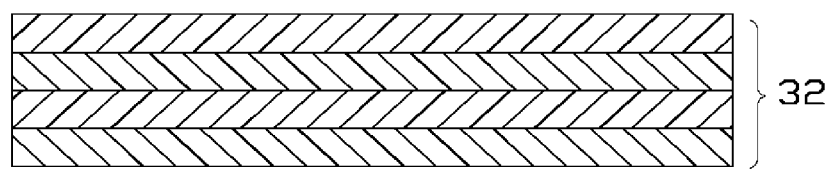
FIG. 4 is a cross-sectional schematic view of an arrangement of an antireflection film of FIG. 1.
Figure 5:
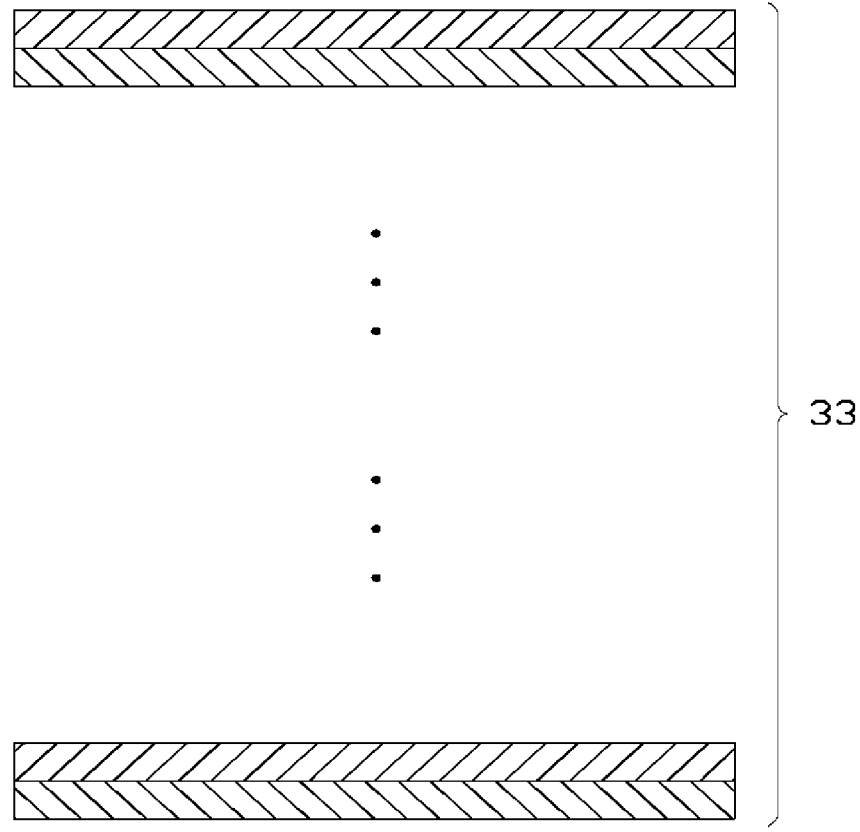
FIG. 5 is a cross-sectional schematic view of an arrangement of an infrared filtering film of FIG. 1.

Referring to FIGS. 2-3, in use, light rays enter into the lens module 100 from the object-side end 11 of the lens barrel 10 and strike the filter element 30. The light rays orderly penetrate the anti-reflection film 32, the transparent substrate 31, and the infrared filtering film 33. The infrared light rays of the light rays penetrating the anti-reflection film 32 are filtered by the infrared filtering film 33. As the anti-reflection film 32 enhances transmissivity of the light rays projected on the filter element 30, the light rays reflected by the anti-reflection film 32 are less than about 5%. Therefore, the light rays can form reducing a glare in an image, and the quality of the image is enhanced.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
a lens barrel comprising an object-side end and an image-side end opposite to the object-side end;
at least one lens received in the lens barrel; and
a filter element received in the lens barrel, and comprising a transparent substrate, an anti-reflection film, and an infrared filtering film; the transparent substrate comprising an object-side surface facing the object-side end and an image-side surface facing the image-side end; the anti-reflection film coated on the object-side surface, and the infrared filtering film coated on the image-side surface;
wherein the anti-reflection film comprises first to fourth layers orderly stacked on the object-side surface, the odd numbered layers of the anti-reflection film are made from titanium dioxide (TiO$_2$), and the even numbered layers of the anti-reflection film are made from silicon dioxide (SiO$_2$); the thicknesses of the first, second, third and fourth layers of the anti-reflection film are respectively 11.52 nm, 28.93 nm, 111.15 nm, and 83.78 nm;
wherein the infrared filtering film comprises first to fifty fourth layers orderly stacked on the image-side surface, the odd numbered layers of the infrared filtering film are made from TiO$_2$, and the even numbered layers of the infrared filtering film are made from SiO$_2$; the thicknesses of the first to fifty fourth layers of the infrared filtering film are respectively 7.28 nm, 18.67 nm, 86.78 nm, 142.53 nm, 80.33 nm, 132.59 nm, 81.28 nm, 128.33 nm, 81.96 nm, 124.34 nm, 83.38 nm, 121.71 nm, 83.92 nm, 123.09, 84.08 nm, 124.78 nm, 84.81 nm, 134.73 nm, 97.58 nm, 192.39 nm, 104.2 nm, 148.59 nm, 83.66 nm, 143.14 nm, 93.6 nm, 177.52 nm, 105.92 nm, 158.12 nm, 87.79 nm, 152.72 nm, 96.32 nm, 174.89 nm, 104.29 nm, 163.45 nm, 100.46 nm, 180.21 nm, 115.65 nm, 188.01 nm, 117.25 nm, 191.74 nm, 118.28 nm, 192.04 nm, 116.57 nm, 192.79 nm, 117.32 nm, 190.86 nm, 118.16 nm, 190.44 nm, 116.69 nm, 191.4 nm, 114.71 nm, 186.74 nm, 113.18 nm, and 92.44 nm.

2. The lens module of claim 1, wherein the anti-reflection film is configured for enhancing transmissivity of light rays projected thereon, and the infrared filtering film is configured for filtering infrared light rays.

3. The lens module of claim 2, further comprising an image sensor positioned at the image-side end, wherein the filter element is positioned between the least one lens and the image sensor.

4. The lens module of claim 3, wherein the anti-reflection film faces the at least one lens, and the infrared filtering film faces the image sensor.

5. The lens module of claim 1, wherein the transparent substrate is made of glass, and a thickness of the transparent substrate is from about 0.2 mm to about 0.8 mm.

* * * * *